United States Patent [19]

Smith

[11] Patent Number: 4,813,452
[45] Date of Patent: Mar. 21, 1989

[54] KINETIC CHECK VALVE

[76] Inventor: Roger R. Smith, 7261 Lyons Rd., Imlay City, Lapeer County, Mich. 48444

[21] Appl. No.: 102,181

[22] Filed: Sep. 28, 1987

[51] Int. Cl.⁴ .............................................. F16K 15/06
[52] U.S. Cl. .................................... 137/542; 137/540; 137/514.7
[58] Field of Search ...................... 137/540, 542, 514.7

[56] References Cited

U.S. PATENT DOCUMENTS

| 620,936 | 3/1899 | Kunzer | 137/542 X |
|---|---|---|---|
| 625,360 | 5/1899 | Shattock | 137/542 |
| 754,569 | 3/1904 | Jones | 137/542 X |
| 1,095,931 | 5/1914 | Saxon | 137/542 X |
| 1,157,196 | 10/1915 | Von Philp | 137/542 |
| 1,607,969 | 11/1926 | Thaete | 137/542 X |
| 1,773,726 | 8/1930 | Deming | 137/542 X |
| 1,990,130 | 2/1935 | Moos | 137/542 X |
| 2,114,921 | 4/1938 | Gessner | 137/542 X |
| 4,082,224 | 4/1978 | Mangus | 137/542 X |
| 4,084,609 | 4/1978 | Johnson | 137/542 X |
| 4,271,862 | 6/1981 | Snoek | 137/542 X |
| 4,574,836 | 3/1986 | Barnard, Jr. | 137/542 X |

Primary Examiner—John Rivell
Attorney, Agent, or Firm—Peter A. Taucher; Gail S. Soderling

[57] ABSTRACT

A check valve with a shaped outlet port and interior fluid passage provides a valve with improved fluid flow characteristics.

3 Claims, 1 Drawing Sheet

KINETIC CHECK VALVE

GOVERNMENT INTEREST

The invention described herein may be manufactured, used, and licensed by or for the Government for governmental purposes without payment to me of any royalty thereon.

BACKGROUND OF THE INVENTION

In one aspect this invention relates to check valves useful for controlling the flow of liquids. In a further aspect, this invention relates to check valves with a smoother fluid flow.

Check valves are designed to be moved between an open and a closed position to control the flow of fluid under pressure. In general the flow control mechanisms in such valves are designed as if the flow was a static state condition. Thus fluid flowing through the normal check valve from intake port to the outlet port must generally make one or more drastic direction changes within the valve. Further, the poppet used in sealing the valves is generally designed with surfaces that cause turbulence in the fluid as it passes through the valve and fluid passing by the poppet will pass through varying cross-sectional area passages which causes pressure variations. Such valves become progressively inefficient due to increased turbulence as the flow increases with higher flow rates and pressures. Therefore, the valves become less useful at higher pressures and flow rates and are best suited for low flow rates and low pressures.

SUMMARY OF THE INVENTION

The present invention discloses an improved kinetic check valve which is adapted to start and stop the flow of fluid between an inlet and an outlet to allow metering of the fluid in a controlled manner at higher pressures and flow rates. The present valve has a housing with an inlet port adapted to be connected to the source of pressurized fluid and an outlet port fluidly connected to a device to receive the pressurized fluid. A smooth curved shape bore is located between the inlet port and outlet port to allow a smooth relatively turbulent free passage between the ports. The shaped bore has a valve seat formed as part of the bore to allow sealing the fluid flow when desired. A valve member is mounted within the valve and is movable between an open and closed position. The valve member has a stem extending longitudinally within the housing with a poppet located on one end of the stem, The poppet being shaped to minimize turbulence in the fluid stream. A sealing land is formed about the periphery of the poppet and a tapered section connects the sealing land to the valve stem. In the open position the poppet is located within the shaped outlet port so that fluid entering the port is deflected around the poppet as it enters the outlet port. The poppet's shape creates a relatively uniform annular cross sectional area for the fluid to flow through the intake port into the shaped bore. In the closed position, the poppet land will engage the valve seat formed in the shaped intake port and prevent the flow of fluid.

Some form of activating means is used to control the poppets position. In one iteration, the valve has a spring which will bias the valve to a closed position when no fluid is being pumped. When fluid is pumped, pressure on the poppet will move the poppet to the open position within the shaped outlet port.

BRIEF DESCRIPTION OF THE DRAWINGS

In the accompanying drawing

DETAILED DESCRIPTION OF PREFERRED EMBODIMENT

Figure 1:
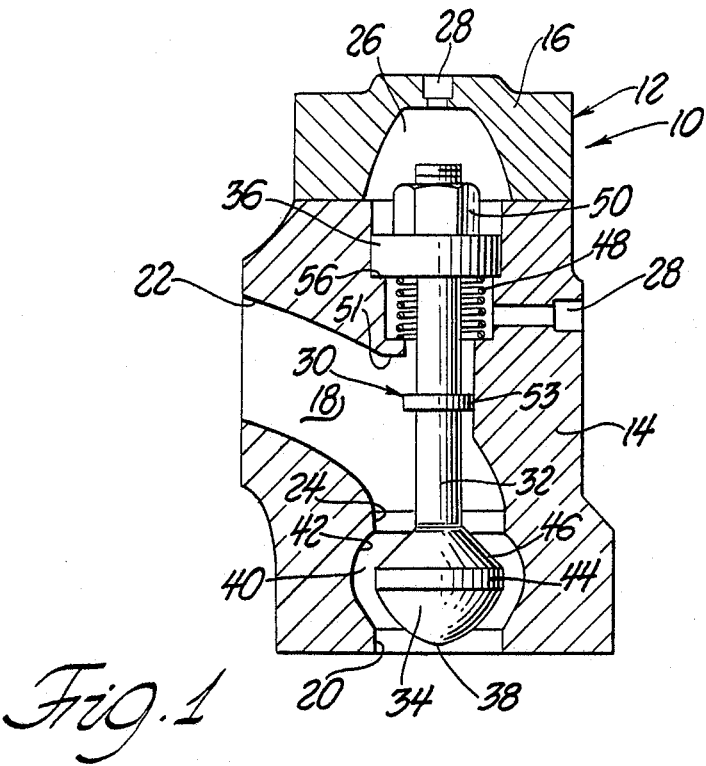
FIG. 1 is a sectional view of a valve according to this invention shown in the open position.

Referring to the accompanying drawing and initially to FIG. 1 which shows a kinetic check valve of this invention in an open position, the valve 10 has a housing 12 formed by a first body portion 14 and a second body portion 16 joined together to form the housing. The first body portion 14 contains a curved shaped bore 18 extending between an intake port 22 and a shaped outlet port 20. The intake port 22 has a sealing land 24 formed at the juncture between the shaped outlet port 20 with the curved shape bore 18. The first body portion 14 and second body portion 16 cooperate to form plenum 26 located near the upper portion of the housing 12 as depicted. A first port 28 is located in the second body portion 16 to allow a pressurized fluid flow into and out of the plenum on the side of a seal 36 in fluid communication with the shaped bore 18. A second port 28 in the second body portion 16 will allow the flow of fluid into and out of the plenum to allow movement of the valve between its open and closed positions. The second port 28 is located totally within the first body portion.

In greater detail, a valve member 30 includes a stem portion 32 which connects the shaped poppet 34 and a seal 36 to form the unitary valve member. As shown, the poppet 34 has a streamlined tip 38 located on the end of the valve member 30 so that as fluid enters the outlet port 20 fluid is gently directed around the poppet and through the shaped bore 40 formed between the poppet 34 and sidewalls 42 of the outlet port 20. The fluid flowing through the shaped bore 40 encounters a substantially uniform cross sectional area between the bore and the poppet as it travels through the shaped bore 40. The uniform cross sectional area and smooth configuration formed by the rounded poppet allow fluid to flow smoothly as it transverses the bore and exits the outlet port 20. The sealing land 24 on the housing is designed to cooperate with the complimentary sealing land 44 formed on the poppet 34 to stop the fluid flow. The seal 36 is attached to the end of the valve member 30 opposite the poppet 34. As shown the seal 36 is retained in position by a nut 50 screwed onto a threaded portion of the stem. A coil spring 48 is coaxially aligned about the stem 32 of the valve member 30. One end of spring 48 is in contact with the seal 36 and the other end of the spring contacts a lip 51 formed on the first body portion 14. The lip 51 cooperates with a raised collar 53 on the valve stem to seal plenum 26 from the bore 18 when the valve is closed.

Figure 2:
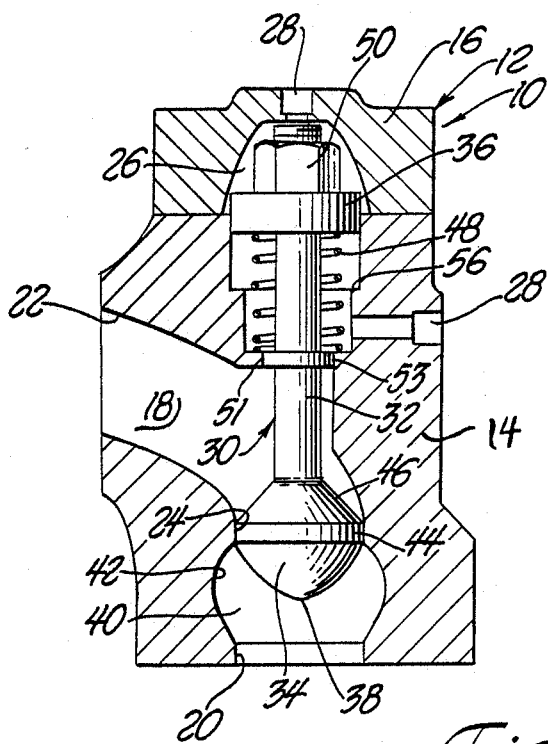
FIG. 2 is a sectional view of the valve of FIG. 1 shown in the closed position.

FIG. 2 shows the valve in FIG. 1 in the closed position wherein the sealing land 24 formed in the shaped intake port is in contact with the sealing land 44 formed on the poppet to form a fluid tight seal and the collar 53 is in contact with lip 51.

To open the valve, fluid under pressure is admitted to the inlet port 22 which applies a force against upper surface 46 of the poppet, the hydraulic force counteracting the spring force of spring 48 to move the poppet to the open position where the seal 36 touches a ledge 56 which will block the valves movement and hold the poppet 34 properly centered in the outlet port 20. Fluid can leave the plenum 26 via the first port 28 when the valve is opening. When it is desired to close the valve, the fluid source is turned off and the coil spring 48 will return the valve to its closed position so the sealing land 24 on the valve coacts with the sealing surface 44 on the poppet to prevent fluid flow back into the valve. As shown, the sealing land 24 and associated sealing land 44 is a straight side configuration. The sealing land could be formed as a frusto-conical shape with the larger base portion pointed toward the outlet port. A shaped configuration will allow the valve to be opened easier and would prevent sticking. As the valve closes, the fluid in plenum 26 can exit through the second port 28.

The activating mechanism as shown is a coil spring which operates automatically However, other activating means such as solenoids or pressure activated diaphragms can also be incorporated into the valve structure to perform the opening and closing functions. Such activating systems provide a different type of control. Such systems are known in the art and a detailed description is omitted in the interest of brevity.

I wish it to be understood that I do not desire to be limited to the exact details of construction shown and described for obvious modifications will occur to a person skilled in the art, without departing from the spirit and scope of the appended claims.

What is claimed is:

1. An improved kinetic check valve adapted to start and stop the flow of a pressurized fluid comprising: a housing having an inlet port adapted to be connected to a source of pressurized fluid, a shaped outlet port fluidly connected to a device to receive the pressurized fluid, a curved shaped bore between the inlet port and the outlet port allowing passage of fluid between the ports, said shaped bore having a valve seat formed therein, a valve member moveable between an open and a closed position the valve member having a streamlined shaped, rounded poppet with a sealing land formed about the periphery of the poppet, the sealing land being adapted to engage the valve seat, the poppet being shaped so when the poppet is in the open position the poppet is located entirely within the the shaped outlet port the poppet's shape creating a relatively constant cross section in the outlet port for fluid to flow smoothly through the outlet port out of the shaped bore, the shaped poppet having a streamlined tip to reduce turbulence in the fluid flow as the pressurized fluid is traversing the outlet port, and in the closed position the sealing land will engage the valve seat formed in the shaped outlet port; a biasing means attached to the poppet which biases the poppet to a normally closed position when no pressure is applied to the poppet by the pressurized fluid.

2. The check valve of claim 1 wherein said biasing means further comprises; a valve stem having one end attached to the poppet; a seal member attached to the end of the valve stem distal the poppet; and a coil spring coaxially aligned about the valve stem, one end of the spring being in contact with a complimentary lip formed on the housing and the other end of the coil spring being in contact with the seal, the coil spring having sufficient force to urge the poppet into the closed position when no pressurized fluid is being introduced into the valve.

3. An improved kinetic check valve adapted to start and stop the flow of fluid comprising a housing having an inlet port adapted to be connected to a source of pressurized fluid, a shaped outlet port fluidly connected to a device to receive the pressurized fluid, a curved shaped bore between the inlet port, said shaped bore having a valve seat formed therein, a valve member movable between an open and a closed position the valve member having a stem extending longitudinally within the housing, a rounded streamlined shaped poppet located on one end of the valve stem, a sealing land formed about the periphery of the poppet and a tapered portion connecting the sealing land to the valve stem, the poppet being shaped so that when located entirely within the shaped outlet port in the open position the fluid which is entering the port is deflected as it enters the outlet port the poppet's shape creating a relatively constant cross section for fluid to flow smoothly through the outlet port out of the shaped bore, the poppet having a shaped tip to reduce fluid turbulence as it exits the outlet port and in the closed position the land will engage the valve seat formed in the shaped intake port; a seal affixed to the end of the valve stem opposite the poppet; a coil spring coaxially disposed about the valve stem, one end of the coil spring being in contact with the seal and the other end of the coil spring being in contact with an annular rim located within the housing, the coil spring biasing the valve to the closed position when there is no substantial pressure in the shaped bore and allowing the valve to move to an open position when a pressure is applied to the poppet which overcomes the spring force.

* * * * *